United States Patent
Allen et al.

(10) Patent No.: US 8,178,796 B2
(45) Date of Patent: *May 15, 2012

(54) MAILING MACHINE TRANSPORT SYSTEM INCLUDING A GUIDE TO REDUCE THE IMPACT ON THE WEIGHING DEVICE CAUSED BY THE TRAILING EDGE OF THE MAILPEICE

(75) Inventors: Robert J. Allen, Shelton, CT (US); Thomas M. Lyga, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/640,510

(22) Filed: Dec. 17, 2009

(65) Prior Publication Data

US 2011/0147093 A1  Jun. 23, 2011

(51) Int. Cl.
*G01G 19/414* (2006.01)
*G01G 21/00* (2006.01)

(52) U.S. Cl. ............... 177/25.15; 177/145; 177/184

(58) Field of Classification Search ............... 177/25.15, 177/145, 184–189; 705/407, 414–416
See application file for complete search history.

(56) References Cited

U.S. PATENT DOCUMENTS

| | | | |
|---|---|---|---|
| 4,709,770 A * | 12/1987 | Kohashi et al. | 177/50 |
| 4,848,492 A | 7/1989 | Hubbard et al. | |
| 5,054,566 A | 10/1991 | Freeman | |
| 5,094,306 A | 3/1992 | Cohen et al. | |
| 5,109,937 A | 5/1992 | Kipp | |
| 5,190,117 A | 3/1993 | Freeman et al. | |
| 5,256,835 A | 10/1993 | Rydzak | |
| 5,723,825 A | 3/1998 | Dolan et al. | |
| 5,726,393 A * | 3/1998 | Lyga | 177/25.15 |
| 5,813,327 A | 9/1998 | Freeman et al. | |
| 5,856,637 A * | 1/1999 | Vande Berg | 177/145 |
| 6,713,689 B2 | 3/2004 | Eaton et al. | |
| 6,759,602 B2 | 7/2004 | Miller et al. | |
| 6,820,873 B2 | 11/2004 | Kulpa | |
| 6,839,697 B2 | 1/2005 | Eaton et al. | |
| 6,940,025 B1 * | 9/2005 | Salomon | 177/25.15 |
| 7,247,801 B2 | 7/2007 | Salazar et al. | |
| 7,750,254 B2 * | 7/2010 | Wall et al. | 177/25.15 |
| 2005/0205307 A1 * | 9/2005 | Salomon | 177/1 |
| 2011/0036647 A1 * | 2/2011 | Schulzki | 177/145 |
| 2011/0147095 A1 * | 6/2011 | Sye | 177/25.15 |
| 2011/0290569 A1 * | 12/2011 | Turner | 177/1 |

* cited by examiner

*Primary Examiner* — Randy W Gibson
(74) *Attorney, Agent, or Firm* — Brian A. Lemm; Charles R. Malandra, Jr.; Steven J. Shapiro

(57) ABSTRACT

A mail processing system having a transport that reduces the amount of oscillation of the scale to allow for faster weighing of mail pieces is provided. A mailing machine includes a plurality of different modules through which mail pieces are fed by a transport system. A guide piece is provided in the transport path between the weighing module and the subsequent module, e.g., a printing module. The guide piece is structured such that forces imparted on the weighing platform of the weighing module by the trail edge of a mail piece being transported off of the weighing platform are reduced. Because of the reduction in this significant external force on the weighing platform, a faster weighing algorithm can be used on more mail pieces, thereby increasing the throughput of the mailing machine.

18 Claims, 4 Drawing Sheets

1

MAILING MACHINE TRANSPORT SYSTEM INCLUDING A GUIDE TO REDUCE THE IMPACT ON THE WEIGHING DEVICE CAUSED BY THE TRAILING EDGE OF THE MAILPEICE

FIELD OF THE INVENTION

The invention disclosed herein relates generally to mail processing systems, and more particularly to a mail processing system having a transport mechanism with an integral scale that reduces the time required for weighing mail pieces.

BACKGROUND OF THE INVENTION

Mail processing systems for preparing mail pieces, e.g., stuffing envelopes, and/or printing postage indicia on envelopes and other forms of mail pieces have long been well known and have enjoyed considerable commercial success. There are many different types of mail processing systems, ranging from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Typically, a control device, such as, for example, a microprocessor, performs user interface and controller functions for the mail processing system. Specifically, the control device provides all user interfaces, executes control of the mail processing system and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The control device, in conjunction with an embedded PSD, constitutes the system meter that satisfies U.S. information-based indicia postage meter requirements and other international postal regulations regarding closed system meters.

In order for these automated mailing machines to be effective, they must process and handle "mixed mail." The term "mixed mail" is used herein to mean sets of intermixed mail pieces of varying size (for example, from postcards to 9"×12" flats), thickness (for example, from 0.007 inches thick up to 0.75 inches thick), and weight (for example, from less than one ounce up to several pounds). In addition, the term "mixed mail" also includes stepped mail (i.e., an envelope containing an insert which is smaller than the envelope to create a step in the envelope), tabbed and untabbed mail products, and mail pieces made from different substrates. Thus, the range of types and sizes of mail pieces which must be processed is extremely broad. In known mixed mail handling machines which separate and transport individual pieces of mail away from a stack of mixed mail, the stack of mixed mail is first loaded onto some type of transport system for subsequent sorting into individual pieces of mail. The mail piece is conveyed downstream utilizing the transport system, such as rollers or a belt, to each of the different modules (as described above) for processing.

One such module can be a weighing module to calculate the weight of a particular mail piece, or determine that some predetermined threshold is not exceeded, as it is being processed. The calculated weight (or threshold) is provided to the control device for calculation of the postage amount required for the mail piece based on the actual weight. In some weighing modules, the mail piece is temporarily stopped on the scale of the weighing module while the weight is measured, while in others the mail piece is not completely stopped and a weight measurement is made while the mail piece is in motion. In either case, it is necessary to ensure that an accurate weight has been determined, or accurately determine that the mail piece does not exceed a threshold amount, since the postage amount is determined based on the actual weight or threshold amount. If the weighing module does not accurately weigh a mail piece or determine that it is below the threshold amount, the amount of postage applied to the mail piece will either be too little, resulting in possible non-delivery of the mail piece, or too much, resulting in a loss of funds. The need for accuracy in determining the weight to be used for calculating postage provides constraints on the time required to determine the weight. In automated mailing machines, there is a constant need to increase the rate at which the scale can determine the weight (or that the mail piece does not exceed a threshold weight) of a mail piece such that the overall throughput of the machine can be increased. A basic cause of the delay in determining weight for a mail piece is the tendency of the scale to oscillate when a mail piece is being transported (or stopped) on the scale. These oscillations are damped as the scale settles, but only slowly will the scale arrive at a stable output value representative of the weight of the mail piece. To determine the weight of a mail piece, or that the weight of a mail piece does not exceed a predetermined threshold weight, as quickly and accurately as possible, it is desirable to minimize the external forces on the scale that can cause the scale to oscillate, thereby reducing the time required to determine a weight.

SUMMARY OF THE INVENTION

The present invention alleviates the problems associated with the prior art and provides a mail processing system having a transport that reduces the external forces on the scale to allow for faster weighing of mail pieces.

In accordance with embodiments of the present invention, a mailing machine includes a plurality of different modules through which mail pieces are fed by a transport system. A guide piece is provided in the transport path between the weighing module and the subsequent module, e.g., a printing module. The guide piece is structured such that forces imparted on the weighing platform of the weighing module by the trail edge of a mail piece being transported off of the weighing platform are reduced. More specifically, the guide piece causes the trail edge of the mail piece leaving the weighing platform to remain at the same level as or lift away from the weighing platform, thereby significantly reducing, if not eliminating, any forces from the trail edge of the exiting mail piece as the weighing module acquires the first peak in the waveform signal for weighing the subsequent mail piece. With the significant reduction in the forces due to the trail edge of the exiting mail piece, the first peak in the waveform generated by the weighing module for the next mail piece will be unaltered by the external force of the trail edge. Because of the reduction in this significant external force, the first peaks are now representative of the forces imparted only by the mail piece being weighed, and thus a fast weighing algorithm that utilizes only the first peak can be used on more mail pieces. Since the time for determining the weight for more mail pieces will be decreased, the throughput of the mailing machine can be increased.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
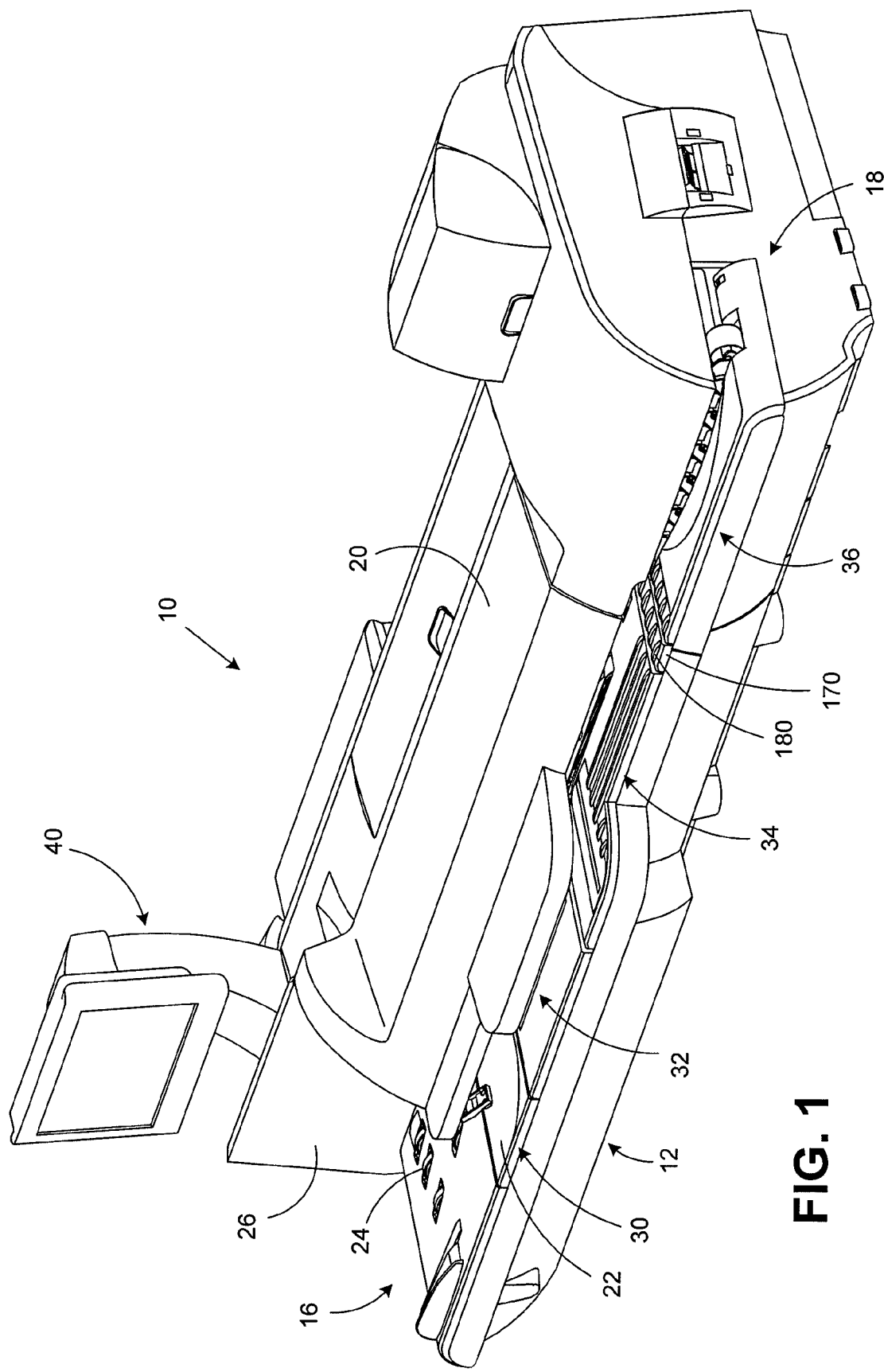
FIG. 1 illustrates an example of a mail processing system according to an embodiment of the present invention.

In describing the present invention, reference is made to the drawings, wherein there is seen in FIG. 1 an illustrative mail processing system in the form of a mailing machine 10 according to an embodiment of the present invention. Mailing machine 10 comprises a base unit, designated generally by the reference numeral 12, the base unit 12 having a mail piece input end, designated generally by the reference numeral 16, and a mail piece output end, designated generally by the reference numeral 18. One or more cover members 20 are pivotally mounted on the base 12 so as to move from the closed position shown in FIG. 1 to an open position (not shown) to expose various operating components and parts for service and/or repair as needed.

The base unit 12 further includes a horizontal feed deck 22 which extends substantially from the input end 16 to the output end 18. A plurality of nudger rollers 24 are suitably mounted under the feed deck 22 and project upwardly through openings in the feed deck so that the periphery of the rollers 24 is slightly above the upper surface of the feed deck 12 and can exert a forward feeding force on a succession of mail pieces placed in the input end 16. A registration wall 26 defines a mail piece registration surface substantially perpendicular to the feed deck 22 that extends substantially from the input end 16 to the output end 18. Mail pieces placed in the input end 16 are fed by the nudger rollers 24 along the feed deck 22, with the top edge of the mail piece being registered against the wall 26. The mail pieces may be passed through one or more modules, such as, for example, a singulator module 30, a moistening/sealing module 32, a weighing module 34, and a printing module 36. An optional stacking bin (not shown) may be provided at the output end 18 of the mailing machine 10.

Mailing machine 10 includes a control unit 40 that preferably includes one or more processing units, such as, for example, a microprocessor, general or special purpose processor or the like, to control operation of the mailing machine 10. Specifically, the control unit 40, in conjunction with one or more other processors or controllers (not shown), provides all user interfaces, executes control of the mailing machine 10, calculates postage for debit based upon rate tables, provides the conduit for an associated Postal Security Device (PSD) to transfer postage indicia for printing, operates with peripherals for accounting, printing and weighing, and conducts communications with a data center for postage funds refill, software download, rates download, and market-oriented data capture. The PSD, which is preferably embedded in the control unit 40, contains one or more registers that store the accounting information concerning usage, such as, for example, an ascending register, descending register, piece count register, and the like. The control unit 40, in conjunction with the embedded PSD, provides the system meter that satisfies U.S. and international postal regulations regarding closed system information-based indicia postage (IBIP) meters.

Figure 2:
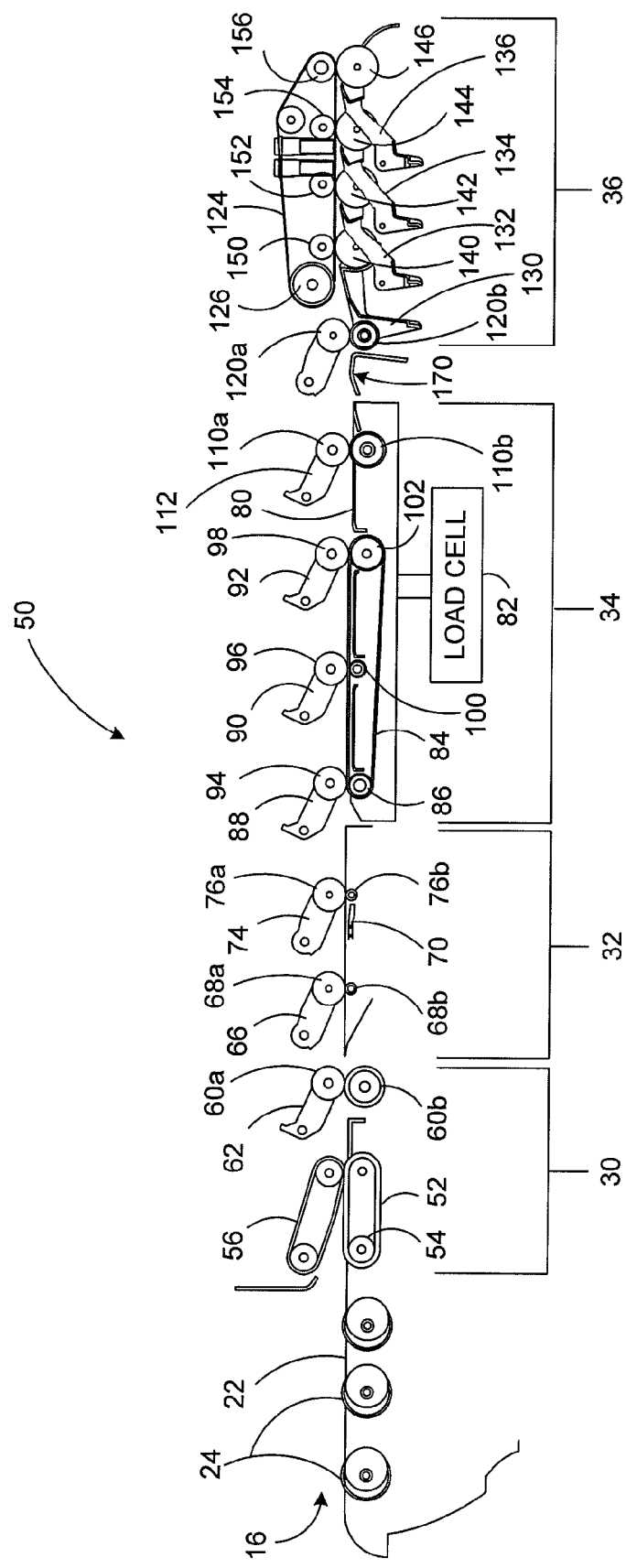
FIG. 2 illustrates in partial schematic diagram form an example of a transport system used by the mail processing system of FIG. 1 according to an embodiment of the present invention.

Mailing machine 10 further includes a transport system described in more detail in FIG. 2. In general, the transport system includes the nudger rollers 24 and other rollers and/or belts (not visible in FIG. 1) that are located under the cover member 20, and is utilized to transport mail pieces along a transport path through the mail processing system 10 in the direction from the input end 16 to the output end 18. The transport system will transport the mail pieces through the singulator module 30 to separate a stack of mail pieces placed on the nudger rollers 24 and feed them in seriatim fashion to the moistening/sealing module 32. The transport will then carry the mail pieces through the weighing module 34 for weighing, and through the printing module 36 where an indicium, generated by the control unit 40, is printed on each mail piece, or alternatively, on a tape to be placed onto a mail piece. Sensors (not shown) located along the feed deck 22 and within the transport system provide signals to the control unit 40 to indicate the position of a mail piece in the mailing machine 10.

FIG. 2 illustrates in partial schematic diagram form an example of a transport system 50 that can be used in the mailing machine 10 of FIG. 1. The nudger rollers 24 are located near the input end 16 of the mailing machine 10 and are motorized to urge mail pieces placed thereon in the direction of the singulator module 30. The singulator module 30 includes a belt 52 mounted on a drive roller 54 which is coupled by any suitable drive train (not shown) to a motor (not shown) to rotate the belt 52 in a clockwise direction. The belt 52 is raised above the top of the feed deck 22 such that it will engage the bottom mail piece in a stack of mail pieces (not shown) and pull the stack of mail pieces into engagement with a reverse singulating belt 56 that rotates in a clockwise direction to push the mail pieces on top of the stack in the reverse direction (back towards the input end 16 of the mailing machine 10). In this manner, only the bottom most mail piece of the stack advances to a take-away nip formed by rollers 60a, 60b. A drive roller 60b extends above the top of the feed deck 22 and is suitably coupled to a motor (not shown) such that it will rotate to move the mail piece along the feed deck 22. Roller 60a is mounted to a spring-loaded pivot arm 62 to apply a downward force to the mail piece so that the mail piece is maintained in frictional contact with the drive roller 60b. The take-away nip formed by rollers 60a, 60b serves to transport the mail piece removed from the stack of mail pieces into the moistening/sealing module 32. Preferably, the roller 60b operates at a slightly faster speed than the belt 54, thereby maintaining the mail piece under tension and preventing buckling of the mail piece.

The moistening/sealing module 32 includes an input nip formed by a spring-loaded pivot arm 66 with a drive roller 68a and a back-up roller 68b that receives each mail piece from the singulator module 30. Drive roller 68a serves to move each mail piece to a stripper blade/moistening apparatus 70 that, when activated, operates to open and moisten the flap of the mail piece. A take-away nip formed by a spring-loaded pivot arm 74 with a drive roller 76a and a back-up roller 76b serves to transport the mail piece into the weighing module 34 and also to provide pressure to seal the moistened flap of the mail piece to the body of the envelope. Preferably, the drive roller 76a operates at a slightly faster speed than the drive roller 68a, thereby maintaining the mail piece under tension and preventing buckling of the mail piece.

The weighing module 34 includes a weighing platform 80 that is separate from the feed deck 22. The weighing platform 80 is coupled to a load cell 82 which determines the weight of a mail piece on the weighing platform 80. The weighing module 34 utilizes a drive belt 84 mounted on a drive roller 86. The top of the drive belt 84 is raised above the weighing platform 80 to contact a mail piece on the weighing platform 80. Drive roller 86 is coupled by any suitable drive train to a motor (not shown) that causes the belt 84 to rotate in a clockwise direction to move a mail piece through the weighing module 34. Preferably, the belt 84 operates at a slightly faster speed than the drive roller 76a, thereby maintaining the mail piece under tension as it enters the weighing module 34 and preventing buckling of the mail piece. To keep the mail piece in contact with the drive belt 84, spring-loaded pivot arms 88, 90, and 92 are provided above the drive belt 84. At the free end of each pivot arm 88, 90, 92, a roller 94, 96, 98 is mounted to contact the mail piece as the mail piece is driven by the drive belt 84 and to apply a downward force to the mail piece so that the bottom of the mail piece is maintained in frictional contact with the drive belt 84. To prevent the drive belt 84 from deflecting due to the force imparted by the pivot arm 88, 90, 92, a respective backup roller (including drive roller 86 and rollers 100, 102) is provided behind the drive belt 84 at each point where the belt 84 is in contact with a roller 94, 96, 98 mounted on a pivot arms 88, 90, 92. Each pair of rollers formed of a pivot arm roller 94, 96, 98 and the corresponding backup roller 86, 100, 102 constitutes a spring-loaded nip through which the mail piece is fed by the drive belt 84. A take-away nip is formed by take-away rollers 110a, 110b. Roller 110a is mounted on a spring loaded pivot arm 112 to contact the mail piece and apply a force to the mail piece to keep it in frictional contact with the drive roller 110b. The drive roller 110b is coupled to a motor (not shown) to rotate in a clockwise direction to move a mail piece off of the weighing platform 80 and into the printing module 36. Preferably, the drive roller 110b operates at a slightly faster speed than the belt 84, thereby maintaining the mail piece under tension and preventing buckling of the mail piece as it enters the printing module 36. The entire transport assembly, including the spring-loaded pivot arms 88, 90, 92 and 112 and the rollers 94, 96, 98, 110a on the end of each, is mounted to or mechanically coupled to the weighing platform 80 and thus forms part of the tare weight for the load cell 82.

The printing module 36 includes an input nip, formed by roller 120a mounted on the end of a spring-loaded pivot arm 122 and a drive roller 120b, that receives the lead edge of each mail piece as it exits from the weighing module. Drive roller 120b is coupled to a motor (not shown) to rotate in a clockwise direction to receive a mail piece from the weighing platform 80 move it into contact with a drive belt. Preferably, the drive roller 120b operates at a slightly faster speed than the drive roller 110b, thereby maintaining the mail piece under tension and preventing buckling of the mail piece as it enters the printing module 36. The drive belt 124 is mounted on a drive roller 126. Drive roller 126 is coupled by any suitable drive train to a motor (not shown) that causes the belt 124 to rotate in a counter-clockwise direction to move a mail piece through the printing module 36. In contrast with the transport components of the weighing module 34, the main drive mechanism for the printing module 36 (belt 124) is located such that it contacts the top surface of the mail piece as compared to the drive mechanisms of the weighing module 34 (belt 84, drive roller 110b) and the input drive roller 120b of the printing module 36 that contact the bottom surface of the mail piece. As such, the mail piece must transition from being bottom registered, i.e., contacting the drive mechanism on the bottom of the mail piece, to being top registered, i.e., contacting the drive mechanism on the top of the mail piece. It should be understood, of course, that transport system 50 could be formed of any one or combination of both of top registered and bottom registered drive mechanisms. To keep the mail piece in contact with the drive belt 124, spring-loaded pivot arms 130, 132, 134, 136 are provided below the drive belt 124. At the free end of each pivot arm 130, 132, 134, 136 a roller 140, 142, 144, 146 is mounted to contact the mail piece as the mail piece is driven by the drive belt 124 and to apply an upward force to the mail piece so that the mail piece is maintained in frictional contact with the drive belt 124. To prevent the drive belt 124 from deflecting due to the force imparted by the pivot arms 130, 132, 134, 136, a respective backup roller 150, 152, 154 and 156 is provided behind the drive belt 124 at each point where the belt 124 is in contact with a roller 140, 142, 144, 146 mounted on a pivot arms 130, 132, 134, 136. Each pair of rollers formed of a pivot arm roller 140, 142, 144, 146 and the corresponding backup roller 150, 152, 154, 156 constitutes a spring-loaded nip through which the mail piece is fed by the drive belt 124.

The number of mail pieces that can be processed by the mailing machine 10, referred to as throughput and usually expressed in letters per minute, is based on several factors. When operating in a weighing mode, in which each mail piece will be weighed by the weighing module 34, one factor that reduces the throughput is the amount of time required for each mail piece to be accurately weighed or to determine that a mail piece does not exceed some predetermined threshold weight. To increase the throughput, it is desirous to reduce the amount of time necessary to determine a weight that can be used to calculate postage. However, it is also necessary to ensure that the determined weight is accurate, since the postage amount is determined based on the weight. If the weighing module 34 does not accurately determine the weight to be used for calculating postage, the amount of postage applied to the mail piece will either be too little, resulting in possible non-delivery of the mail piece, or too much, resulting in a loss of funds. One way to increase throughput is to operate the transport system 50 as quickly as possible. Although only a single mail piece can be on the weighing platform 80 for weighing of the mail piece, the transport system 50 can be operated such that after a mail piece has been weighed and is being removed from the weighing platform 80, the next mail piece is being transported onto the weighing platform 80 to be weighed. However, the weight of the next mail piece cannot be determined until the trail edge of the previous mail piece has left the weighing platform 80.

When a mail piece enters onto the weighing platform 80 a signal is produced by the load cell 82. This signal is processed through electronics and software where it is amplified, concerted form analog to digital, and then filtered. The signal has the general shape of a damped sinusoid, caused by the tendency of the weighing platform 80 to oscillate on the load cell 82 as a mail piece enters the weighing platform 80 for weighing. The signal from the load cell 82 is processed using a weighing algorithm to determine the weight. One such weighing algorithm utilizes an approach that capitalizes on the first peak of the waveform signal. Specifically, if the first peak of the signal produced by the load cell 82 in response to the mail piece being transported onto the weighing platform 80 is below the first weight break or some threshold value slightly less that the first weight break (for example, some value between 0.8 and 0.9 oz for the 1 oz weight break in the US), then it can be accurately assumed that additional peaks later in time in the waveform will not be higher, and thus the mail piece will be in the lowest weight class. By using the first peak in such a manner, it can be determined if the weight of a mail piece is below the first weight break. While the actual weight of a mail piece may not be determined, enough information is obtained to accurately rate (e.g., determine the amount of postage required for delivery) the mail piece based on the lowest weight class. If, however, the first peak of the waveform is above the first weight break or its threshold value, the weighing algorithm assumes that the weight of mail piece is greater than the first weight break and will use a slower, more accurate routine to determine the weight of the mail piece. This involves allowing the oscillations of the weighing platform 80 to settle such that the load cell 82 will arrive at a stable output value representative of the weight of the mail piece.

A limitation of utilizing the first peak to determine that a mail piece is within a first weight break is that external forces can significantly impact the waveform during the acquisition of the first peak. Such external forces can result from speed mismatching, module misalignment, or mail shape factors for the mail piece entering the weighing module. These external forces can cause the first peak to be artificially high for the mail piece being measured. As a result, the more accurate routine will be used, which takes additional time. This results in a lower throughput for the mailing machine. Conventional solutions to reduce external forces have been focused on the areas noted above. The present inventors have discovered that the mail pieces exiting the weighing platform also contribute to the artificial increase of the first peak of the waveform. Specifically, in conventional mailing machines as each mail piece leaves the weighing platform and enters into the printing module, the last bottom registered nip (e.g., the first nip of the printing module 36 formed by rollers 120a, 120b) will act as a fulcrum, causing the trailing edge of the mail piece to rotate downward. This downward rotation imparts a significant impulse, referred to as the trail edge spike, to the weighing platform. This trail edge spike is significant enough to cause the first peak in the waveform for the next mail piece to exceed the threshold for the lowest weight break, resulting in the weighing of the next mail piece to be determined using the slower, more accurate routine, even though the weight of the mail piece is below the threshold for the lowest weight break.

Figure 3:
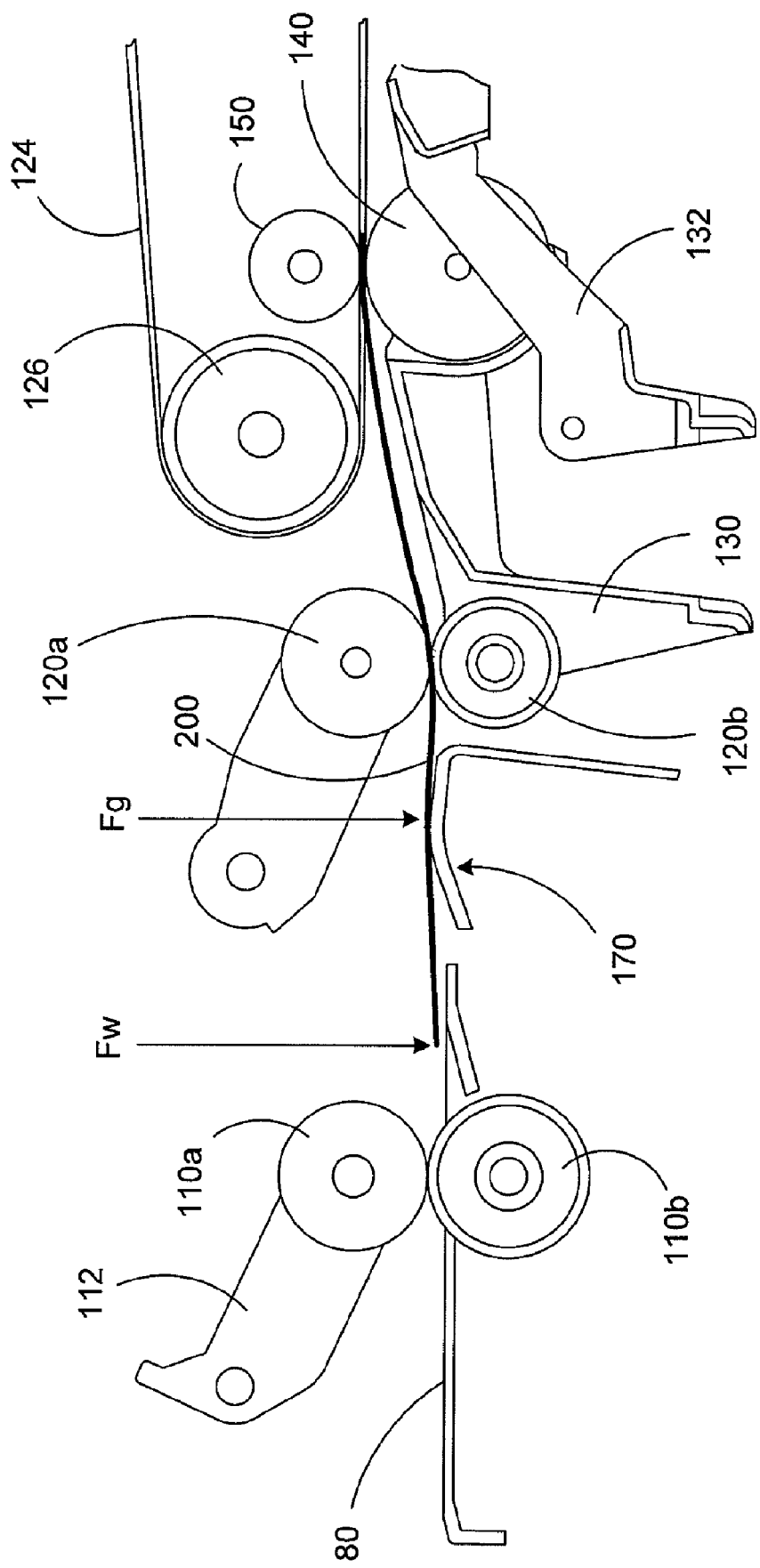
FIG. 3 illustrates in partial schematic diagram form a portion of the transport system of FIG. 2.

Referring again to FIG. 2, transport system 50 includes a guide piece 170 positioned along the transport path between the weighing module 34 and the printing module 36. The guide piece 170 preferably extends along the width of the feed deck 22 (i.e., from the registration wall 26 to the edge of the feed deck 20) as can be seen in FIG. 1. The guide piece is preferably fixedly mounted in place (for example, by securing to the frame or a support piece of the mailing machine 10) such that it is physically separate from the load cell 82 and weighing platform 80. Thus, the guide piece is not part of the tare weight of the load cell 82 and is not in contact with the weighing platform 80. Guide piece 170 is preferably formed of a smooth material, such as, for example, a polymeric material, that has a low friction coefficient to allow mail pieces to slide over the guide piece 170. FIG. 3 illustrates a more detailed view of a portion of the transport system 50 including the guide piece 170. As seen in FIGS. 1 and 3, the guide piece 170 preferably has an arcuate shape, which can be provided, for example, by one or more ribs 180 (FIG. 1) that are located on the guide piece 170. The apex of the guide piece 170 is preferably above the weighing platform 80 and at approximately the same height as the nip formed by the rollers 120a, 120b. As a mail piece 200 passes through the nip formed by rollers 120a, 120b and transitions to the top registration of the belt 124, the rollers 120a, 120b will act as fulcrum, causing the portion of the mail piece located to the left of the nip formed by rollers 120a, 120b to rotate downward. The downward rotation of this portion of the mail piece 200 will cause the mail piece 200 to impart a force $F_g$ on the guide piece 170, and the guide piece 170 will now act as a second fulcrum. The guide piece 170 acting as a second fulcrum will significantly reduce, if not entirely eliminate, the force $F_W$ imparted on the weighing platform 80 (referred to above as the trail edge spike) by the trail edge of the mail piece 200. This reduction in force can be realized by the guide piece 170 causing the trail edge of the mail piece 200 (the portion located to the left of the point where the mail piece 200 contacts the guide piece 170) to stay at the same level as the weighing platform 180 (instead of trying to move to a level below the weighing platform 180, which will cause it to push down on the weighing platform 180) or even lift off of the weighing platform 80 after the trail edge has passed through the take-away nip formed by rollers 110a, 110b and before the trail edge of the mail piece has passed the downstream end of the weighing platform 80. Thus, while the mail piece 200 may still remain in contact with the weighing platform 80, guide piece 170 causes the mail piece to impart less force on the weighing platform 180 before the trail edge of the mail piece 200 has passed the downstream end of the weighing platform 80 (prior to the mail piece 200 exiting the weighing module 34 as the mail piece is transported downstream out of the weighing module 34.

Figure 4:
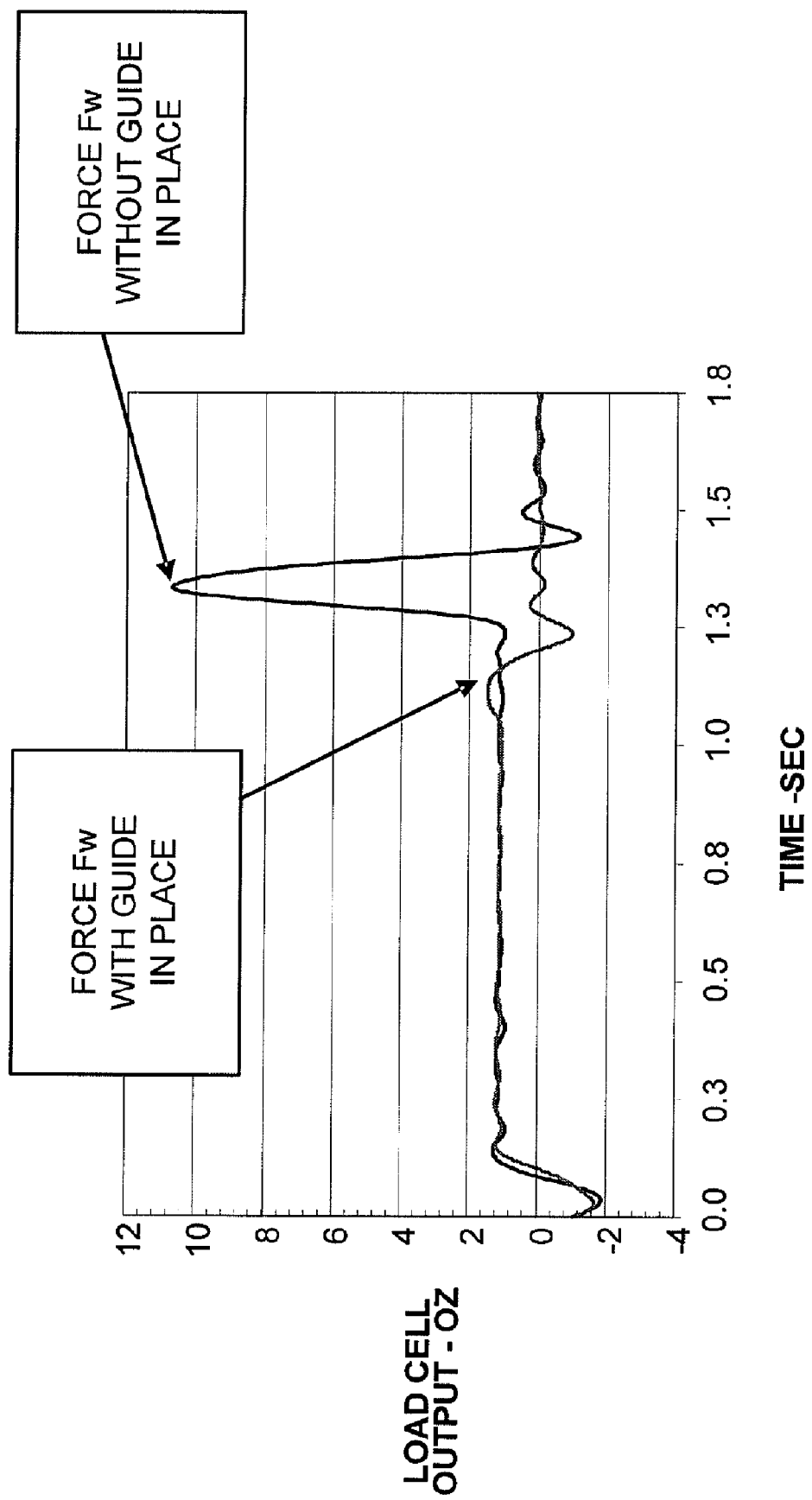
FIG. 4 is a graph illustrating forces present on the weighing platform under different conditions.

In effect, the trail edge spike from the mail piece 200 leaving the weighing platform 80 is imparted on the guide piece 170 (which is not part of the tare for the load cell 82) instead of the weighing platform 80. FIG. 4 illustrates in graph form the force $F_W$ imparted on the weighing platform 80 for a transport system 50 that has the guide piece 170 in place and a transport system that does not have a guide piece in place. As can be seen from FIG. 4, without a guide piece in place, there is a significant spike in the output of the load cell 82 caused by the trail edge imparting a force $F_W$ on the weighing platform (the trail edge spike). With the guide piece 170 in place, the force imparted on the weighing platform 80 is significantly reduced, as the trail edge spike is greatly reduced. With the significant reduction in the trail edge spike, the first peak in the waveform generated by the load cell 82 for the next mail piece will be unaltered by the external force of the trail edge spike. Because of the reduction in this significant external force, the first peaks are now representative of the forces imparted only by the next mail piece, and thus the fast weighing algorithm that utilizes only the first peak can be used on more mail pieces. Since the time for determining the weight for more mail pieces will be decreased, the throughput of the system 10 can be increased.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A mail processing system comprising:
   a transport system for transporting a mail piece along a transport path of the mail processing system;
   a weighing module for weighing the mail piece being transported along the transport path, the weighing module including a load cell for determining a weight of the mail piece and a weighing platform supported by the load cell, the weighing platform for supporting the mail piece being weighed by the load cell;
   a subsequent module located downstream along the transport path from the weighing module; and
   a guide piece located along the transport path between the weighing module and the subsequent module, the guide piece being physically separate from the weighing platform and the load cell, the guide piece adapted to cause a trail edge of a mail piece leaving the weighing platform to impart a reduced force on the weighing platform before the trail edge of the mail piece has passed a downstream end of the weighing platform as the mail piece is transported downstream.

2. The system of claim 1, wherein the guide piece causes the trail edge of the mail piece to stay at a same level as the weighing platform to impart a reduced force on the weighing platform before the trail edge of the mail piece has passed a downstream end of the weighing platform as the mail piece is transported downstream.

3. The system of claim 1, wherein the guide piece causes the trail edge of the mail piece to lift off of the weighing platform to impart a reduced force on the weighing platform before the trail edge of the mail piece has passed a downstream end of the weighing platform as the mail piece is transported downstream.

4. The system of claim 1, wherein the subsequent module further comprises:
   an input nip formed by a roller mounted on a spring-loaded pivot arm and a drive roller, the input nip receiving a lead edge of the mail piece as the mail piece enters into the subsequent module.

5. The system of claim 4, wherein the guide piece is mounted between the weighing module and the subsequent module such that the guide piece is positioned above a top surface of the weighing platform and at a same height as the input nip of the subsequent module.

6. The system of claim 1, wherein the weighing module further comprises:
   at least one first nip located along the weighing platform, each of the at least one first nip formed by a first roller mounted on a respective pivot arm having a biasing mechanism to bias the pivot arm toward the weighing platform such that the first rollers apply force to the mail piece on the weighing platform to maintain the mail piece in contact with a driving device that moves the mail piece along the transport path through the weighing module; and
   a take-away nip located in a downstream direction from the at least one first nip along the weighing platform to feed the mail piece from the weighing module to the subsequent module along the transport path of the mail processing system, the take-away nip being formed by a take-away roller and a drive roller mounted in the weighing platform, the take-away roller being mounted on a take-away pivot arm having the biasing mechanism to bias the pivot arm toward the weighing platform such the take-away roller applies force to the mail piece to maintain the mail piece in contact with the drive roller.

7. The system of claim 1, wherein the subsequent module is a printing module.

8. A mail processing system for processing a mail piece comprising:
   a weighing module, located along a transport path through the mail processing system, to determine a weight for the mail piece, the weighing module including a load cell and a weighing platform supported by the load cell, the weighing platform for supporting the mail piece being weighed by the load cell;
   a transport system, the transport system feeding the mail piece along the transport path through the mail processing system, the transport system having a first portion for feeding the mail piece into the weighing module; and
   a second portion of the transport system located downstream in the transport path from the first portion of the transport system, the second portion of the transport system being isolated from the weighing platform and disposed to engage a lead edge of the mail piece after the mail piece has been weighed, the second portion causing a trail edge of the mail piece to impart a reduced force on the weighing platform prior to the mail piece exiting the weighing module as the mail piece is transported downstream out of the weighing module.

9. The system of claim 8, wherein the second portion causes the trail edge of the mail piece to stay at a same level as the weighing platform prior to the mail piece exiting the weighing module as the mail piece is transported downstream out of the weighing module to impart the reduced force on the weighing platform.

10. The system of claim 8, wherein the second portion causes the trail edge of the mail piece to lift off of the weighing platform prior to the mail piece exiting the weighing module as the mail piece is transported downstream out of the weighing module to impart the reduced force on the weighing platform.

11. The system of claim 8, wherein the first portion of the transport system is at a first elevation along the feed path and the second portion of the transport system is at a second elevation vertically offset above the first elevation.

12. The system of claim 8, wherein the second portion of the transport system comprises a guide piece located along the transport path downstream of the weighing platform.

13. A method of processing a mail piece using a mail processing system comprising:
   transporting the mail piece to a weighing module for weighing the mail piece, the weighing module including a load cell for determining a weight of the mail piece and a weighing platform, supported by the load cell, for supporting the mail piece being weighed by the load cell;

transporting the mail piece along a transport path from the weighing module to a subsequent module located downstream; and after the mail piece has been weighed and is being transported further downstream along the transport path, causing a trail edge of the mail piece to impart a reduced force on the weighing platform before the trail edge has passed a downstream end of the weighing platform.

14. The method of claim 13, wherein causing the trail edge of the mail piece to impart a reduced force on the weighing platform before the trail edge has passed a downstream end of the weighing platform comprises causing the trail edge of the mail piece to stay at a same level as the weighing platform before the trail edge has passed the downstream end of the weighing platform to impart the reduced force on the weighing platform.

15. The method of claim 13, wherein causing the trail edge of the mail piece to impart a reduced force on the weighing platform before the trail edge has passed a downstream end of the weighing platform comprises causing the trail edge of the mail piece to lift off of the weighing platform before the trail edge has passed the downstream end of the weighing platform to impart the reduced force on the weighing platform.

16. The method of claim 13, wherein causing a trail edge of the mail piece to lift off of the weighing platform further comprises:

contacting the mail piece with a guide piece located along the transport path between the weighing module and the subsequent module, the guide piece being physically separate from the weighing platform and the load cell.

17. The method of claim 16, wherein the guide piece is mounted between the weighing module and the subsequent module such that the guide piece is positioned above a top surface of the weighing platform and at a same height as an input nip of the subsequent module.

18. The method of claim 13, wherein the subsequent module is a printing module.

* * * * *